Patented Sept. 16, 1952

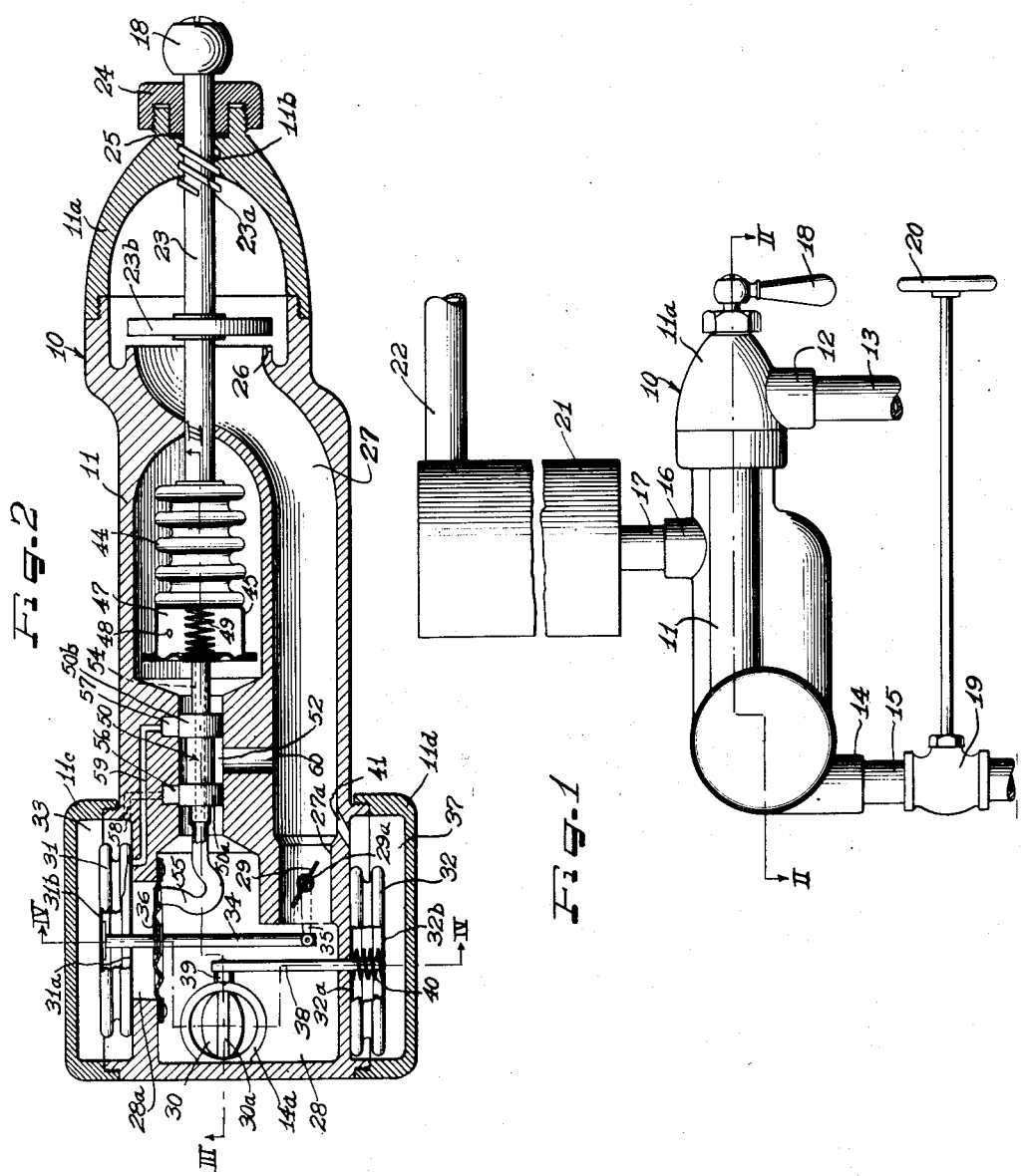

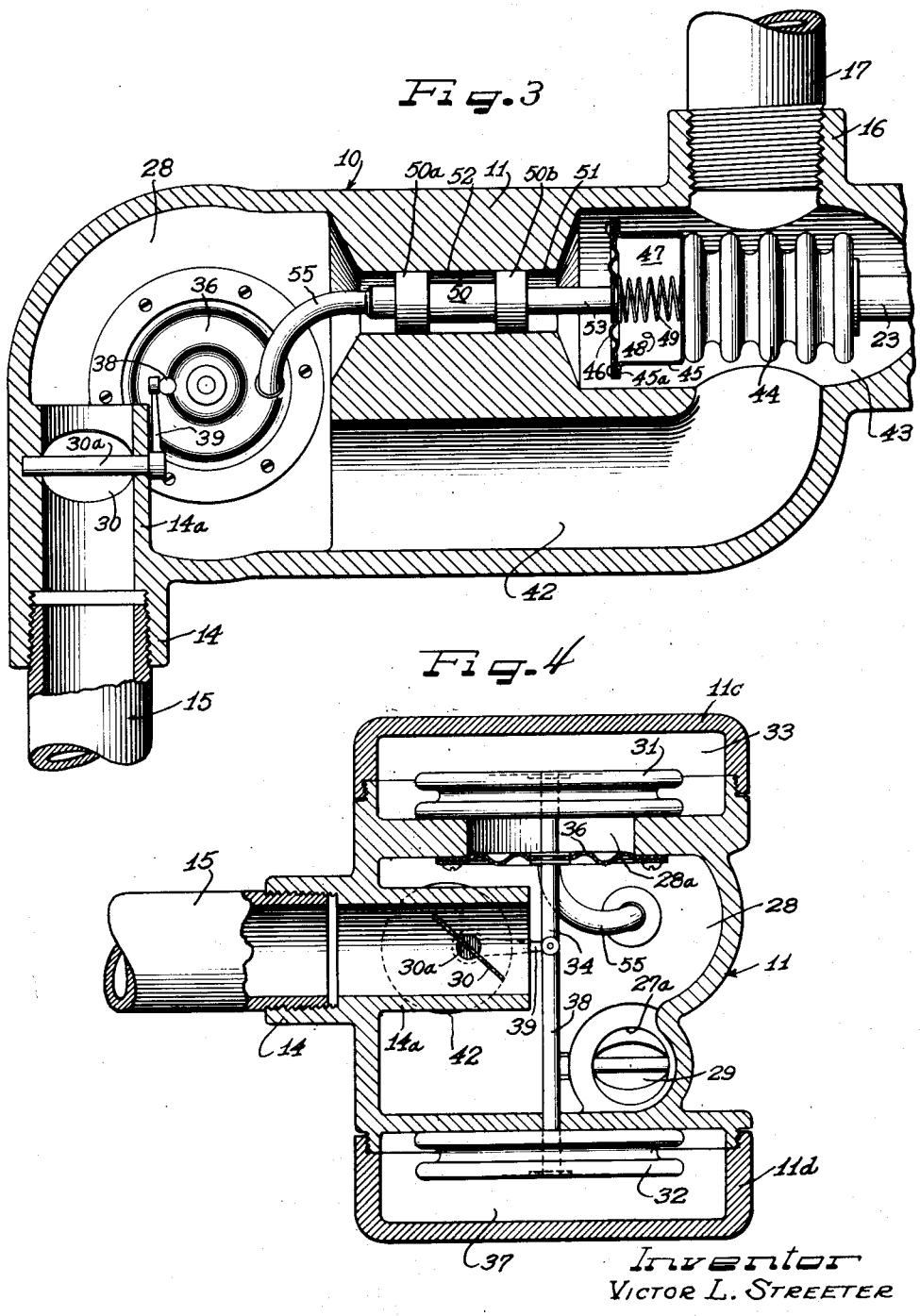

2,610,795

UNITED STATES PATENT OFFICE 2,610,795

FLUID TEMPERATURE CONTROL DEVICE

Victor L. Streeter, Chicago, Ill.

Application June 9, 1950, Serial No. 167,097

6 Claims. (Cl. 236—12)

1

This invention relates to a pressure and temperature-sensitive mixing valve adapted to maintain a substantially constant selected outlet temperature irrespective of variations in inlet temperatures and pressures.

More specifically, this invention deals with a device for regulating the mixing of hot and cold liquids to produce a mixture having a preselected temperature and capable of maintaining this temperature throughout variations in the temperatures and pressures of the hot and cold liquids.

According to this invention, there is provided a temperature and pressure-sensitive mixing valve especially suitable for shower stalls wherein water of any desired temperature can be dialed by manipulation of a single valve and wherein variations in line pressures will not change the dialed temperature.

The valve of this invention will be hereinafter specifically described as embodied in a hot and cold water mixing valve for showers, but it should be understood that the invention is not limited in scope to any particular usage of the valve, since the principles of the invention are generally applicable to devices for delivering fluid at a constant preselected temperature from a plurality of sources of fluid at different temperatures.

The mixing valve of this invention includes a body with a hot water inlet, a cold water inlet, a mixing chamber, and a single outlet. Pressure-sensitive valves control flow from the inlets to the mixing chamber. A manual control is provided with a valve to control flow to one of the inlets, a thermo-sensitive unit, a pilot valve, and a compensator. Actuation of the manual control first opens the manual valve to flow liquid to the first pressure-sensitive valve. The pressure of this liquid is effective to open the valve in the other inlet. Fluids from both inlets are mixed and flow to the outlet around the thermo-sensitive unit. If the temperature of the mixed fluid varies from the temperature for which the control is set, the thermo-sensitive unit expands or contracts to shift the pilot valve, thereby controlling the position of the valve in the first inlet to vary the proportioning of the liquids and produce a mixture of the temperature for which the control is set. In order to prevent "hunting" or "over-control" by the pilot valve, a compensator actuated by movement of the valve in the first inlet is provided to absorb some of the effect of the shifting movement on the pilot valve produced by the thermo-sensitive unit or the manual control. This compensator varies the effective length of the control unit.

It is then an object of this invention to provide a temperature and pressure-sensitive mixing valve.

A further object of the invention is to provide a device for producing a stream of mixed fluids at a substantially constant mixture from a plurality of sources of fluids at different tempera-

2 tures irrespective of variations in the pressures and temperatures of the different fluids.

Another object of the invention is to provide a mixing valve wherein a manual control first opens the valve and then selects a desired temperature for fluid discharged by the valve irrespective of variations in the temperatures and pressures of fluids supplied to the valve.

Another object of the invention is to provide a mixing valve especially adapted for shower stalls and the like wherein cold water inlet pressure must be developed before hot water can flow into the valve, and wherein a metering valve under the triple influence of manual setting, temperature setting, and valve positioning, controls the position of the cold water inlet valve.

A further specific object of the invention is to provide a compensator for a hot and cold water mixing valve which varies the effective length of a control unit as the control unit imparts movement to an inlet valve so that temperature variations in the controlling cycle will be decreased.

A still further specific object of the invention is to provide a hot and cold water mixing valve with a control unit including a shut-off valve, a thermo-sensitive unit, a pilot valve, and a compensator for shifting the position of the pilot valve relative to the control member in response to shifting of a throttle valve controlled by the pilot valve, whereby overrunning of the throttle valve is avoided.

Other and further objects of the invention will be apparent to those skilled in the art from the following detailed description of the annexed sheets of drawings which, by way of a preferred example only, illustrate one embodiment of the invention.

On the drawings:

Figure 1 is a broken fragmentary elevational view of a mixing valve provided by this invention.

Figure 2 is a somewhat enlarged horizontal cross-sectional view taken substantially along the line II—II of Figure 1.

Figure 3 is a fragmentary horizontal cross-sectional view taken substantially along the line III—III of Figure 2, and on a further enlarged scale.

Figure 4 is a vertical cross-sectional view taken along the line IV—IV of Figure 2 and shown on the same scale as Figure 3.

As shown on the drawings:

In Figure 1, the reference numeral 10 designates generally a hot and cold water mixing valve for shower stalls in accordance with a preferred embodiment of this invention. The valve 10 includes a body 11 with a cold water inlet 12 supplied by a pipe 13, a hot water inlet 14 supplied by a pipe 15, a mixed water outlet 16 discharging into a pipe 17 and a control handle 18 for opening and setting the valve. The hot water pipe 15 is preferably equipped with a valve 19 controlled by a handle 20 conveniently located adjacent the handle 18. This valve 19 is used to control rate of flow of hot water and is also desirable as a safety shut-off in the hot water feed.

The mixed fluid from the outlet pipe 17 preferably discharges into the central portion of the bottom of a secondary mixing reservoir or tank 21 which, in turn, discharges through an outlet pipe 22 in the upper side wall thereof. The tank 21 is provided to hold a supply of mixed liquid from the mixing valve to further mix successive flow increments from the mixing valve to insure against a sudden change in temperature at the outlet 22 due to a changing of the valve setting or any changes caused by time delays in operation of the mixing valve. Thus, for example, a bather would notice a gradual rise or drop in temperature and would be able to step out of the shower before being scalded or chilled.

The body 11 has a bonnet 11a threaded on one end thereof and threadably receiving a stem 23 therethrough. A packing nut 24 surrounds the externally projecting portion of the stem and is threaded on the bonnet 11a to hold packing material 25 around the stem as best shown in Fig. 2. The handle 18 is secured to the projecting portion of the stem. Threads 23a on the stem mate with threads 11b in the bonnet so that rotation of the stem will be accompanied by an axial shifting of the stem. The body 11 has a valve seat 26 in the end thereof receiving the bonnet, and a valve head 23b on the stem 23 coacts with the seat 26 to control flow from the bonnet into an inlet passageway 27 of the body. This passageway has a reduced diameter end portion 27a discharging into a mixing chamber 28.

The hot water inlet 14 also has a reduced diameter cylindrical portion 14a projecting into the chamber 28.

A cold water throttle valve 29 is pivotally mounted in the reduced diameter passageway portion 27a and a hot water throttle valve 30 is pivotally mounted in the reduced diameter passage portion 14a. The valves 29 and 30 control flow from the cold and hot water inlets into the mixing chamber. These valves are actuated by pressure-sensitive diaphragms or bellows 31 and 32, respectively.

The bellows 31 has a fixed end wall 31a spanning a chamber 28a in one end of the chamber 28. The housing 11 receives an end cap 11c in threaded relation thereon providing a chamber 33 for the bellows 31. The opposite end 31b of the bellows is free to move in the chamber 33 toward and away from the cap 11c. A stem or rod 34 is secured to the central portion of the free end wall 31b of the bellows and depends therefrom into the chamber 28 to a point adjacent the reduced diameter portion 27a where it is pivotally connected to an arm 35 secured on the mounting pin 29a of the throttle valve 29. Thus, as the end wall 31b of the bellows moves toward the cap 11c, the rod will be raised to swing the arm 35 for closing the valve 29. Conversely, as the end wall 31b moves toward the wall 31a, the rod will be shifted to swing the arm 35 in the reverse direction for opening the valve 29.

A diaphragm 36 is secured on the rod 34 and spans the inner end of the chamber 28a to seal off the chamber 28 from this chamber and provide a sub-chamber between the diaphragm and wall 31a of the bellows. The diaphragm 36 will shift with the rod 34 to vary the volume of this sub-chamber.

A second cap 11d is provided on the end of the body 11 opposite the cap 11c to enclose the second bellows 32 in a separate chamber 37. The bellows 32 in the chamber 37 has its inner end wall 32a fixed on the body 11 and its outer end wall 32b free to move toward and away from the cap 11d. A rod 38 is secured to the central portion of this outer wall 32b of the bellows and is slidable through an aperture in the body to project into the chamber 28 and extend to a position adjacent the reduced diameter inlet portion 14a where it is pinned to an arm 39 on the mounting stem 30a of the hot water valve 30. A spring 40 surrounds the portion of the rod in the bellows 32 to urge the wall 32b toward the cap 11d, and thereby move the valve 30 into closed position.

A vent 41 connects the passage 27 in advance of the reduced diameter portion 27a with the chamber 37 to subject the exterior of the bellows 32 to the pressure of the cold water upstream from the throttle valve 29 and counteract the spring 40 for urging the valve 30 toward open position.

The hot and cold water, proportioned by the throttle valves 29 and 30, mixes in the chamber 28 and flows through a passage 42 (Figure 3) in the housing 11 to a chamber 43 adjacent the outlet 16. The control stem 23 extends into this chamber 43 and carries a thermo-sensitive bellows 44 in a position such that the mixed hot and cold water from the passageway 42 must flow around the bellows en route to the outlet 16, thereby insuring good thermal contact between the water and bellows. The bellows will elongate to increase the effective length of the stem when heated, and will contract to decrease the effective length of the stem when cooled.

The free end of the bellows carries a cup-shaped member 45 having its open face spanned by a diaphragm 46 which is secured to an out-turned lip 45a around the mouth of the cup. The cup and diaphragm provide a chamber 47 which is vented to the chamber 43 through an opening 48. A spring 49 is compressed between the bottom of the cup and the central portion of the diaphragm to resist collapse of the diaphragm into the cup. A pilot valve 50 is slidably mounted in a bore 51 of the housing. The bore connects the chamber 43 with the chamber 28 and is aligned with the center of the diaphragm 46. The pilot valve 50 is of the so-called "dumb-bell" type and includes spaced heads 50a and 50b slidably engaging the wall of the bore 51 and providing a localized chamber 52 therebetween in the bore. The valve has a stem 53 anchored to the central portion of the diaphragm 46 and this stem and body of the valve have a continuous passage 54 therethrough joining the chamber 47 in the cup with a flexible tube 55 as best shown in Figure 2. One end of the tube 55 is disposed over a projecting nubbin portion or stem portion of the pilot valve adjacent the head 50a, while the other end of the tube is sealingly anchored in the diaphragm 36. The chambers 47 and 28a are thereby in communication through the pilot valve and flexible tube.

The valve heads 50a and 50b are adapted to respectively cover and uncover ports 56 and 57 to selectively join the space 52 with one of these ports.

The port 56 is connected through a passage 58 with the space 33 surrounding the bellows 31, while the port 57 is connected through a passage 59 with the interior of the bellows.

The localized chamber or space 52 between the pilot valve heads 50a and 50b is connected through a passage 60 with the cold water inlet passage 27 upstream from the throttle valve 29. Thus, water from this passage 27 can selectively flow to the inside or the outside of the bellows 31 for expanding or compressing the bellows to shift the throttle valve 29. As the rod 34 shifts in response to movement of the bellows 31, the diaphragm 36 is moved therewith to vary the volume of the chamber 28a and cause water to flow into or out of the chamber 47 for expanding or contracting the diaphragm 46 to thereby vary the effective length of the control stem 23 and shift the pilot valve 50.

Operation

It should be understood that the mixing valve of this invention utilizes the inlet pressure of one fluid to open and manipulate the throttle valve for controlling flow of the other fluid, and while the valve has been specifically described as using cold water pressure to manipulate the hot water throttle valve, the inlets could be reversed to utilize hot water pressure for controlling the cold water valve without departing from the principles of the invention.

When the handle 18 of the valve is initially swung from its closed position, the stem 23 is shifted axially to unseat the valve 23b and permit water to flow from the inlet into the passage 27. This initial movement will preferably open the valve 23b to its full capacity. The safety valve 19 is also opened by rotation of the handle 20 to permit hot water to flow to the inlet 14.

The handle 18 is then swung to a position for dialing the desired temperature of the water to be discharged. Suitable pointer and indicia arrangements (not shown) can be used. This movement of the handle will further shift the stem to position the pilot valve 50 relative to the ports 56 and 57. Cold water will flow past the throttling valve into the chamber 28, and the cold water pressure will be effective against the bellows 32 to open the throttle valve 30 for flowing hot water into the mixing chamber 28. The mixed water will thereupon flow through the passage 42 to contact the thermo-sensitive bellows 44. If the temperature of this water varies from the temperature for which the valve handle 18 has been set, the bellows will expand or contract to shift the pilot valve 50 and either vent cold water to the inside or the outside of the bellows 31.

As the bellows 31 expands or contracts, it shifts the rod 34 to adjust the throttling valve 29 and control the rate of discharge of the cold water into the mixing chamber. Thus, expansion of thermo unit 44 will shift throttle valve 29 toward open position to feed in more cold water. At the same time, the shifting rod 34 will change the volume of chamber 28a by movement of the diaphragm 36 and water will flow through the tube 55 and passageway 54 to conversely vary the volume of the chamber 45. These changes in volume of the two chambers will shorten or lengthen the effective length of the stem 23 to further adjust the pilot valve 50. Thus, as the valve 29 is moving toward open position, the volume of chamber 28a increases to draw water from chamber 47, thereby bowing diaphragm 46 inwardly to decrease the effective length of stem 23. This will shift the pilot valve 50 to vent space 52 with port 57, and thereby expand bellows 31 to move valve 29 toward closed position. The vent 48 will bleed water into or out of the chambers 28a and 45 when equilibrium has been reached and the spring 49 assumes its unstressed position shortly after the throttle valve 29 comes to rest. This action of the opposed diaphragm chambers will compensate against over-control of the throttle valve 29 and will decrease temperature variations in the controlling cycle.

In the event of failure or material decrease of pressure in the cold water passage 27, the pressure in the chamber 27 surrounding the bellows 32 will decrease, and the spring 40 will be effective to move the hot water controlling valve 30 toward closing position, thereby shutting off or decreasing the flow of hot water into the mixing chamber. This arrangement prevents scalding in the event of failure of cold water pressure.

Since the thermo-sensitive unit 44 only controls the cold water throttle valve 29, the rate of outflow is controlled by adjustment of the hot water valve 19.

The reservoir or secondary mixing tank 21 preferably is of sufficient volume to hold enough mixed liquid for a discharge flow of about five to eight seconds and is provided between the mixing chamber and the point of use of the mixed fluid as a safety factor to avoid any undesired sudden change in temperature at the outlet. The tank will blend successive flow increments of mixed liquid delivered by the mixing valve and, in turn, will deliver a blended mixture to the outlet 22. The bather will, therefore, be protected against undesired extreme temperature variations. Thus, the bather would notice a gradual rise or drop in temperature due to a manual oversetting of the valve or time delays in functioning of the valve under radical temperature or pressure variations in the valve inlets. The bather would therefore have sufficient time to be able to adjust the valve setting, or step out of the shower before extreme temperature water is discharged. The tank also gives the thermo-sensitive unit sufficient time to react and control the temperature before any extreme temperature water can reach the outlet.

It will be understood that many departures can be made from the preferred hereinabove described embodiment. For example, bimetal thermostat elements could be used in place of illustrated bellows, the pilot valve could assume many different forms other than the illustrated dumb-bell or spool-type valve, the cold water throttle valve could be spring biased like the hot water throttle valve and actuated in one direction only by the pilot valve control, and the compensator could be arranged in any way to act between opposed diaphragms or expansible members for varying the effective length of the control stem.

It is, therefore, to be understood that the invention is not to be limited beyond the scope of the herein appended claims, and that the language of the claims is intended to include equivalents for all of the specified structures.

I claim as my invention:

1. A device for regulating the mixing of hot and cold fluids to produce a mixed fluid of preselected temperature which comprises a body having hot and cold fluid inlets, a mixing chamber and an outlet, first and second throttle valves controlling flow from the inlets to the mixing chamber, pressure-sensitive means for actuating the throttle valves, the pressure sensitive means for the first throttle valve having opposed pressure receiving sides for respectively opening and closing said valve, means biasing the second throttle valve toward closed position, the pressure-sensitive means for said second throttle valve being exposed to inlet pressure upstream from the first throttle valve to oppose the biasing means for opening said second throttle valve, a pilot valve for venting inlet pressure upstream from the first throttle valve selectively to opposite sides of the pressure-sensitive means for the first throttle valve, a control for shifting the pilot valve, a thermo-sensitive means in advance of the outlet for shifting said pilot valve in response to temperature variations, and a compensator actuated by movement of the first throttle valve for counteracting some of the shifting effect of the control and thermo-sensitive means on the pilot valve to prevent overrunning of the first throttle valve.

2. A mixing valve which comprises a valve body having a cold water inlet, a hot water inlet and a single outlet, a throttle valve in each of said inlets, a manually shiftable stem projecting into said body and accessible from the outside of the body, a shut-off valve on said stem controlling flow to the cold water throttle valve, a thermo-sensitive unit on the stem, a pilot valve slidably mounted in the body, means defining a localized chamber between the thermo-sensitive unit and the pilot valve, a diaphragm spanning said chamber and connecting the thermo-sensitive unit with the pilot valve, said pilot valve having a passageway therethrough, pressure-sensitive means for shifting the throttle valve in the cold water inlet, a second diaphragm shiftable with said cold water inlet valve, means in the body providing a closed chamber spanned by said second diaphragm, a flexible tube connecting said closed chamber with the passageway in the throttle valve to place both of the diaphragm chambers in closed communication, passageways selectively controlled by the pilot valve connecting the cold water inlet upstream from the cold water throttle valve and downstream from the shut-off valve with opposite sides of the pressure-sensitive means for the cold water throttle valve, and spring-biased pressure-sensitive means vented to inlet pressure upstream from the cold water throttle valve for holding open the hot water throttle valve.

3. In a mixing valve adapted to maintain a relatively constant temperature the improvement which comprises a pilot valve, a thermo-sensitive means for shifting said pilot valve, a throttle valve, a first diaphragm-closed chamber having the diaphragm thereof shifted with the throttle valve to vary the volume of the chamber, and a second diaphragm-closed chamber between the thermo-sensitive means and the pilot valve in communication with the first chamber for compensating movement imparted to the pilot valve by the thermo-sensitive means in accordance with movement of the throttle valve.

4. A device for delivering a stream of fluid at a constant preselected temperature from a plurality of streams at different temperatures which comprises a body having throttle valve controlled low temperature and high temperature fluid inlets, means controlled by low temperature fluid inlet pressure for opening the high temperature fluid throttle valve, a device responsive to pressures on one side thereof for closing the low temperature throttle valve and responsive to pressures on the opposite side thereof for opening said low temperature throttle valve, a pilot valve exposed to low temperature fluid pressure, a control for said pilot valve to selectively vent the low temperature fluid pressure to opposite sides of said device for controlling the low temperature fluid throttle valve, and a compensator between the control and pilot valve actuated by movement of the low temperature throttle valve to decrease the effect of the control on said low temperature fluid throttle valve.

5. A temperature and pressure-sensitive mixing valve which comprises a body having a plurality of inlets for fluids of different temperatures, a chamber for receiving said fluids from the inlets and an outlet for said chamber, a throttle valve in each inlet, a pressure-sensitive means for controlling each throttle valve, means venting to a first inlet the pressure-sensitive means for the valve in a second inlet to open said valve under the influence of first inlet pressure, means providing a passage for venting first inlet pressure to the pressure-sensitive means for the throttle valve in said first inlet, a pilot valve controlling flow through said passage, whereby said throttle valve in the first inlet will be positioned by first inlet pressure under the influence of the pilot valve setting, a control for shifting said pilot valve, a thermo-sensitive unit on said control for automatically shifting the pilot valve in response to temperature changes adjacent the outlet, and a compensator on said control connected with the pilot valve and actuated by movement of the throttle valve in the first inlet to shift the pilot valve for absorbing the effect of some of the shifting movement of the control and thereby preventing overrunning of said throttle valve in the first inlet.

6. In a mixing valve having separate inlets for cold and hot fluids, a mixing chamber and a common outlet, a throttle valve in each inlet, spring-biased pressure-sensitive means urging the throttle valve in the hot fluid inlet to closed position and being exposed to pressure in the cold fluid inlet for resisting the action of the spring on the throttle valve, a pilot valve vented to pressure in the cold fluid inlet, pressure-sensitive means having opposite sides thereof selectively vented to cold fluid inlet pressure by the pilot valve, a first diaphragm movable with the throttle valve in the cold fluid inlet, a chamber in said mixing valve closed by said first diaphragm, a shiftable control stem, a thermo-sensitive means on said control stem, a second diaphragm on said control stem, means on said control stem defining a chamber closed by said second diaphragm between the thermo-sensitive means and said pilot valve, means joining the chambers closed by the first and second diaphragms, and means for shifting said control stem, whereby the pilot valve will be moved in response to the movement of the stem and the thermo-sensitive means for selectively venting the cold fluid inlet pressure to opposite sides of the pressure-sensitive means for operating the throttle valve in said cold fluid inlet and whereby movement of said throttle valve will effect shifting of the second diaphragm for causing shifting of the first diaphragm to compensate against an overrunning of the throttle valve in the cold fluid inlet.

VICTOR L. STREETER.

REFERENCES CITED

The following references are of record in the file of this patent:

UNITED STATES PATENTS

| Number | Name | Date |
|---|---|---|
| 1,806,394 | Giesler et al. | May 19, 1931 |
| 1,869,663 | Cartier | Aug. 2, 1932 |
| 2,214,147 | Scott | Sept. 10, 1940 |
| 2,415,994 | Curtis | Feb. 18, 1947 |
| 2,508,074 | Miller et al. | May 16, 1950 |